United States Patent
Yu et al.

(10) Patent No.: US 11,164,447 B2
(45) Date of Patent: Nov. 2, 2021

(54) METHOD FOR EVACUATING PERSONS AROUND AUTONOMOUS VEHICLE, APPARATUS AND STORAGE MEDIUM THEREOF

(71) Applicant: BEIJING BAIDU NETCOM SCIENCE AND TECHNOLOGY CO., LTD., Beijing (CN)

(72) Inventors: Ning Yu, Beijing (CN); Chengfa Wang, Beijing (CN); Fan Yang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 21 days.

(21) Appl. No.: 16/653,703

(22) Filed: Oct. 15, 2019

(65) Prior Publication Data
US 2020/0184806 A1 Jun. 11, 2020

(30) Foreign Application Priority Data
Dec. 10, 2018 (CN) .......................... 201811505308.6

(51) Int. Cl.
*G08G 1/005* (2006.01)
*B60Q 1/52* (2006.01)
(Continued)

(52) U.S. Cl.
CPC ............. *G08G 1/005* (2013.01); *B60Q 1/525* (2013.01); *B60Q 5/006* (2013.01); *G06K 9/00369* (2013.01); *G06K 9/00791* (2013.01)

(58) Field of Classification Search
CPC .......... B60Q 1/50; B60Q 1/525; B60Q 5/005; B60Q 5/006; G06K 9/00369; G06K 9/00791; G08G 1/005
See application file for complete search history.

(56) References Cited

U.S. PATENT DOCUMENTS

| 10,434,935 B1 * | 10/2019 | Zhang ................... G08G 1/005 |
| 2011/0057782 A1 * | 3/2011 | Chundrlik, Jr. ........... B60R 1/00 340/436 |

(Continued)

FOREIGN PATENT DOCUMENTS

| CN | 101299154 A | 11/2008 |
| CN | 104021673 A | 9/2014 |

(Continued)

OTHER PUBLICATIONS

Search Report for Chinese application No. 201811505308.6, dated Jul. 30, 2019 with English translation provided by Google Translate.
(Continued)

*Primary Examiner* — Omer S Khan
(74) *Attorney, Agent, or Firm* — Ladas & Parry, LLP (57) ABSTRACT

A method, an apparatus and a storage medium for evacuating a person around an autonomous vehicle are proposed. The method includes: obtaining data about surrounding of the autonomous vehicle during the driving of the autonomous vehicle; recognizing a person with onlooker intention within a predetermined range around the autonomous vehicle according to the data obtained; evacuating the person with onlooker intention in a predetermined manner. The technical solution may be applied to ensure normal driving of the autonomous vehicle.

11 Claims, 3 Drawing Sheets

(51) Int. Cl.
*G06K 9/00* (2006.01)
*B60Q 5/00* (2006.01)

(56) References Cited

U.S. PATENT DOCUMENTS

| | | | | |
|---|---|---|---|---|
| 2017/0124781 | A1* | 5/2017 | Douillard | G08G 1/096816 |
| 2018/0173230 | A1* | 6/2018 | Goldman-Shenhar | |
| | | | | B60W 50/08 |
| 2018/0173961 | A1 | 6/2018 | Jain et al. | |
| 2018/0326982 | A1* | 11/2018 | Paris | B60W 50/0097 |
| 2019/0027028 | A1* | 1/2019 | Fields | G08G 1/162 |

FOREIGN PATENT DOCUMENTS

| | | |
|---|---|---|
| CN | 104290745 A | 1/2015 |
| CN | 106004671 A | 10/2016 |
| CN | 106828388 A | 6/2017 |
| CN | 107645652 A | 1/2018 |
| CN | 108736983 A | 11/2018 |
| CN | 109969172 A | 7/2019 |

OTHER PUBLICATIONS

First Office Action issued in Chinese application No. 201811505308.6, dated Aug. 13, 2019 with English translation provided by Global Dossier.
Second Office Action issued in Chinese application No. 201811505308.6, dated Sep. 20, 2019 with English translation provided by Global Dossier.
Third Office Action and search report from CN app. No. 201811505308.6, dated Jan. 3, 2020, with English translation from Global Dossier.
Fourth Office Action from CN app. No. 201811505308.6, dated Mar. 19, 2020, with English translation from Global Dossier.

* cited by examiner

METHOD FOR EVACUATING PERSONS AROUND AUTONOMOUS VEHICLE, APPARATUS AND STORAGE MEDIUM THEREOF

CROSS REFERENCE TO RELATED APPLICATION

The present application claims the priority to Chinese Patent Application No. 201811505308.6, filed on Dec. 10, 2018, with the title of "Method for evacuating persons around autonomous vehicle, apparatus and storage medium thereof". The disclosure of the above application is incorporated herein by reference in its entirety.

TECHNICAL FIELD

The present disclosure relates to computer application technologies, and particularly to a method for evacuating persons around an autonomous vehicle, an apparatus and a storage medium thereof.

BACKGROUND

As technologies develop, application of autonomous vehicles will become more and more extensive. For example, the autonomous vehicles may be used to perform tasks such as food delivery and medicine delivery.

For most people, autonomous vehicles are still relatively new and novel. Upon seeing new and novel things, people inevitably look on them, and people are more likely to look on autonomous vehicles driving in a low-speed scenario.

In an initial stage of the development of autonomous vehicles, environment perception and refined control of autonomous vehicles are not perfect, and the driving strategy is relatively conservative. As such, when the autonomous vehicle is looked on by onlookers, for example, if there are more persons in front of the vehicle, the vehicle can hardly drive like a normal vehicle, thereby causing stop of the vehicle in a long period of time and affecting the completion of the task.

During a testing phase of the vehicle, technicians may follow the vehicle and manually remind the persons to disperse. However, when the vehicle is actually put into use, there will be no more technicians who follow the vehicle. In this case, how to ensure the normal driving of the vehicle is a problem to be solved urgently.

SUMMARY

In view of the above, the present disclosure proposes a method for evacuating persons around an autonomous vehicle, an apparatus and a storage medium thereof.

Specific technical solutions are as follows:

According to an embodiment, a method for evacuating a person around an autonomous vehicle is proposed, the method may include:

obtaining data about surrounding of the autonomous vehicle during the driving of the autonomous vehicle;

recognizing a person with onlooker intention within a predetermined range around the autonomous vehicle according to the data obtained;

evacuating the person with onlooker intention in a predetermined manner.

According to an embodiment, obtaining the data about surrounding of an autonomous vehicle may include: obtaining data about surrounding of the autonomous vehicle acquired by at least one of a camera or a radar mounted on the autonomous vehicle.

According to an embodiment, recognizing a person with onlooker intention within a predetermined range around the autonomous vehicle according to the data obtained may include: analyzing the data obtained, and in response to determining, through analysis, that a duration that a person is staying within the predetermined range around the autonomous vehicle is longer than a first predetermined period, identifying the person as the person with onlooker intention.

According to an embodiment, evacuating the person with onlooker intention in a predetermined manner may include: evacuating the person with onlooker intention by at least one of playing a voice or displaying text on a screen of the autonomous vehicle.

According to an embodiment, obtaining data about surrounding of the autonomous vehicle may include: obtaining data about surrounding of an autonomous vehicle in response to determining that a duration that the autonomous vehicle is driving at a speed lower than a predetermined threshold is longer than a second predetermined period.

According to an embodiment, an apparatus for evacuating a person around an autonomous vehicle is proposed, the apparatus may include an evacuating module, and the evacuating module may include:

an obtaining unit for obtaining data about surrounding of the autonomous vehicle during the driving of the autonomous vehicle;

a recognizing unit for recognizing a person with onlooker intention within a predetermined range around the autonomous vehicle according to the data obtained; and an evacuating unit for evacuating the person with onlooker intention in a predetermined manner.

According to an embodiment, the obtaining unit may obtain data about surrounding of the autonomous vehicle acquired by at least one of a camera or a radar mounted on the autonomous vehicle.

According to an embodiment, the recognizing unit may analyze the data obtained, and in response to determining, through analysis, that a duration that a person is staying within the predetermined range around the autonomous vehicle is longer than a first predetermined period, identifying the person as the person with onlooker intention.

According to an embodiment, the evacuating unit evacuates the person with onlooker intention by at least one of playing a voice or displaying text on a screen of the autonomous vehicle.

According to an embodiment, the apparatus may further include a pre-processing module for notifying the evacuating module to perform its own function when it is determined that a duration that the autonomous vehicle is driving at a speed lower than a predetermined threshold is longer than a second predetermined period.

According to an embodiment, a computer device is proposed, the computer device may include a memory, a processor and a computer program which is stored on the memory and runs on the processor, the processor, upon executing the program, implementing the above-mentioned method.

According to an embodiment, it is proposed a computer-readable storage medium on which a computer program is stored, the program, when executed by the processor, implementing the aforesaid method.

As may be seen from the above, with the technical solutions of the present disclosure, it is possible to, during the driving of the autonomous vehicle, recognize a person with onlooker intention within a predetermined range around the autonomous vehicle according to the obtained data about the surrounding of the vehicle, and evacuate the person with onlooker intention in a predetermined manner, thereby ensuring normal driving of the autonomous vehicle.

DETAILED DESCRIPTION OF EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

In addition, it should be appreciated that the term "and/or" used in the text is only an association relationship depicting associated objects and indicates that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
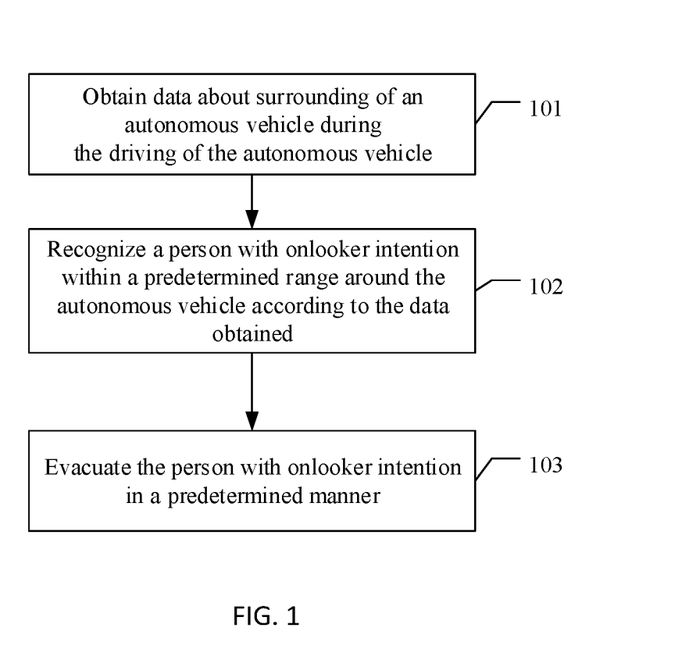
FIG. 1 is a flow chart of a method for evacuating persons around an autonomous vehicle according to a first embodiment of the present disclosure.

FIG. 1 is a flow chart of a method for evacuating persons around an autonomous vehicle according to a first embodiment of the present disclosure. As shown in FIG. 1, the following specific implementation mode is included.

At 101, data about surrounding of the autonomous vehicle is obtained during the driving of the autonomous vehicle.

At 102, a person with onlooker intention within a predetermined range around the vehicle is recognized according to the data obtained.

At 103, the person with onlooker intention is evacuated in a predetermined manner.

During the driving of the autonomous vehicle, data about surrounding of the vehicle acquired by a camera and/or radar mounted on the vehicle may be obtained. The camera and/or radar may acquire data about surrounding of the vehicle in real time, and correspondingly, the data about surrounding of the vehicle acquired by the camera and/or radar may be obtained in real time.

The camera usually includes a binocular camera mounted in front of the vehicle, a monocular camera mounted on both sides of the vehicle, and a monocular camera mounted in rear of the vehicle. Image data about surrounding of the vehicle may be acquired with the camera.

The radar may include ultrasonic radars and laser radars. Taking the laser radar as an example, a laser beam may be emitted to a target from a light source, and then a reflected signal may be compared and processed with the emitted signal to obtain information such as a distance, azimuth speed and shape of the target object, and a three-dimensional stereo image may be generated to help an autonomous driving brain to recognize persons, track a trajectory, draw a high-precision map and so on.

Furthermore, one or more persons, such as pedestrians, with onlooker intention within a predetermined range around the vehicle may be recognized according to the obtained data. In practical application, one or more persons with onlooker intention within a predetermined range around the vehicle may be recognized according to the data acquired by a camera, or one or more persons with onlooker intention within a predetermined range around the vehicle may be recognized according to the data acquired by a radar, or one or more persons with onlooker intention within a predetermined range around the vehicle may be recognized by combination of the data acquired by a camera and the data acquired by a radar. Preferably, the last method may be employed.

A specific value of the predetermined range around the vehicle may be determined according to actual needs. It may be believed that persons who are out of the predetermined range around the vehicle will not affect the normal driving of the vehicle, and processing will not be performed.

How to recognize a person, such as a pedestrian, with onlooker intention within the predetermined range around the vehicle may be determined according to actual needs. For example, the obtained data may be analyzed, and if it is determined through analysis that a duration that a person, such as a pedestrian, is staying within the predetermined range around the vehicle is longer than a first predetermined period, the person may be identified as a person with onlooker intention.

For any person, based on the obtained data, if it is determined by a technique such as target tracking that a duration that the person is staying within a predetermined range around the vehicle is longer than the first predetermined period, then the person may be identified as a person with onlooker intention. The specific value of the first predetermined period may also be determined according to actual needs.

Staying within a predetermined range around the vehicle for a duration longer than the first predetermined period may mean staying at a certain location within a predetermined range around the vehicle without moving, for example staying in front of the vehicle without moving, or may mean keeping moving within a predetermined range around the vehicle, for example, walking around the vehicle, for a duration longer than the first predetermined period.

Persons recognized as having onlooker intention may be evacuated in a predetermined manner. For example, persons with onlooker intention may be evacuated by playing a voice, and/or persons with onlooker intention may be evacuated by displaying text on a screen of the vehicle. Certainly, other possible implementation modes may also be employed.

A horn may be installed at a position such as at the top of the vehicle, and the horn may be used to play the voice to evacuate the persons with onlooker intention. For example, the voice informs the person that the vehicle is performing an urgent task such as delivering food or delivering medicine, and asks the persons to avoid the vehicle.

At present, a small screen is often mounted on a manned vehicle such as a taxi to display content such as an advertisement. In a similar manner, a small screen may be mounted in front of the autonomous vehicle or at a certain position on the roof of the vehicle. The small screen may display relevant text to evacuate persons with onlooker intention, for example, display the text "the vehicle is performing a medicine delivering task, please avoid the vehicle".

Figure 2:
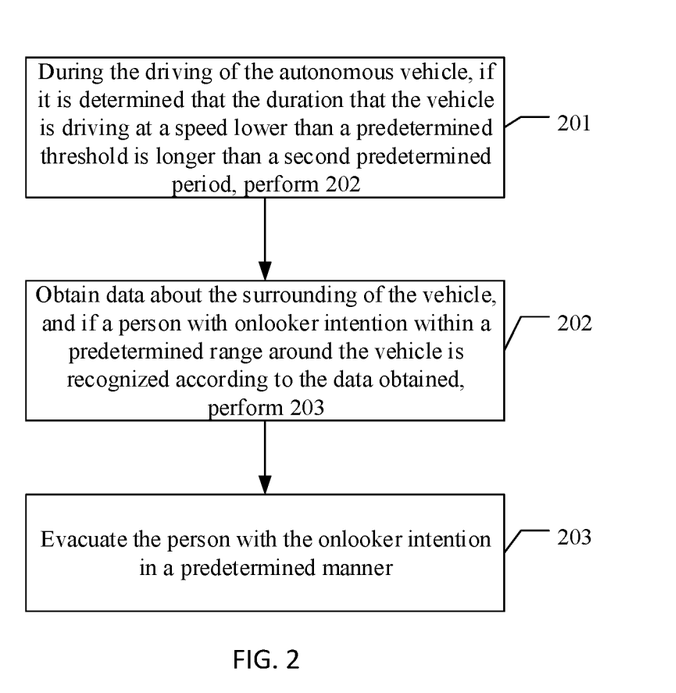
FIG. 2 is a flow chart of a method for evacuating persons around an autonomous vehicle according to a second embodiment of the present disclosure.

FIG. 2 is a flow chart of a method for evacuating a person around an autonomous vehicle according to a second embodiment of the present disclosure. As shown in FIG. 2, the embodiment includes the following implementation mode.

At 201, during the driving of the autonomous vehicle, if it is determined that a duration that the vehicle is driving at a speed lower than a predetermined threshold is longer than a second predetermined period, 202 will be performed.

A specific value of the predetermined threshold may be determined according to actual needs.

At 202, data about the surrounding of the vehicle is obtained, and if a person with onlooker intention within a predetermined range around the vehicle is recognized according to the data obtained, 203 will be performed.

For example, data about surrounding of the vehicle acquired by a camera and/or radar mounted on the vehicle may be obtained.

The obtained data may be analyzed, and if it is determined, through analysis, that a duration that a person is staying within the predetermined range around the vehicle is longer than a first predetermined period, the person may be identified as a person with onlooker intention.

Staying within a predetermined range around the vehicle may mean staying at a certain location within a predetermined range around the vehicle without moving, for example staying in front of the vehicle without moving, or may mean keeping moving within a predetermined range around the vehicle, for example, walking around the vehicle.

At 203, the person with onlooker intention is evacuated in a predetermined manner.

One or more persons, such as pedestrians, recognized as having onlooker intention may be evacuated in a predetermined manner. For example, persons with onlooker intention may be evacuated by playing a voice, and/or persons with onlooker intention may be evacuated by displaying text on a screen on the vehicle. Certainly, other possible implementation modes may also be employed.

A horn may be installed at a position such as at the top of the vehicle, and the horn may be used to play the voice to evacuate the persons with onlooker intention. For example, the voice informs the person that the vehicle is performing an urgent task such as delivering food or delivering medicine, and asks the persons to avoid the vehicle.

At present, a small screen is often mounted on a manned vehicle such as a taxi to display content such as an advertisement. In a similar manner, a small screen may be mounted in front of the autonomous vehicle or at a certain position on the roof of the vehicle. The small screen may display relevant text to evacuate persons with onlooker intention, for example, display the text "the vehicle is performing a medicine delivering task, please avoid the vehicle".

Compared with the embodiment shown in FIG. 1, in the embodiment shown in FIG. 2, before the process shown in FIG. 1 is performed, judgment will be first performed as to whether the duration that the vehicle is driving at a speed lower than a predetermined threshold is longer than a second predetermined period. When the judgement result is yes, the subsequent process, namely, the process shown in FIG. 1, will be performed. In other words, if the vehicle is in a relatively normal drive state, e.g., the vehicle is driving at a speed higher than 30 km/h, or, although the vehicle is driving at a speed lower than 30 km/h, but the duration is very short, the process shown in FIG. 1 needn't be performed. On the contrary, if the duration that the vehicle is driving at a speed lower than 30 km/h exceeds the second predetermined period, the process shown in FIG. 1 will be performed. In this way, it is possible to avoid keeping performing an operation such as recognizing persons with onlooker intention, thereby saving computing resources and the like.

In addition, if it is recognized from the obtained data that there are no person with onlooker intention within the predetermined range around the vehicle, this indicates that the vehicle's failure to drive normally is not caused by onlooker persons and might be caused by other factors such as traffic control. In this case, processing may not be performed, or corresponding processing may be performed in other predetermined manners.

It needs to be appreciated that for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments and the involved actions and modules are not necessarily requisite for the present disclosure.

In the above embodiments, embodiments are respectively described with different emphasis being placed, and reference may be made to related depictions in other embodiments for portions not detailed in a certain embodiment.

In one word, the solutions of the method embodiments of the present disclosure may be employed to evacuate persons with onlooker intention in time, thereby ensuring the normal driving of the autonomous vehicle.

The above introduces the method embodiments. The technical solution of the present disclosure will be further described through an apparatus embodiment.

Figure 3:
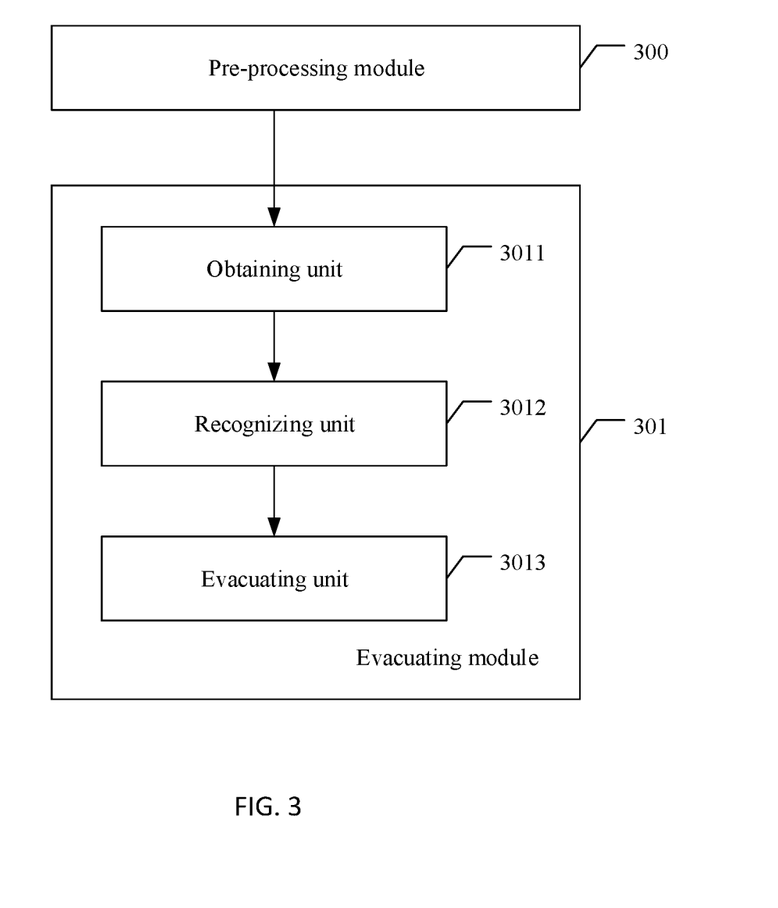
FIG. 3 is a structural schematic diagram of components of an apparatus for evacuating persons around an autonomous vehicle according to an embodiment of the present disclosure.

FIG. 3 is a structural schematic diagram of components of an apparatus for evacuating persons around an autonomous vehicle according to an embodiment of the present disclosure. As shown in FIG. 3, the apparatus comprises an evacuating module 301 which includes an obtaining unit 3011, a recognizing unit 3012 and an evacuating unit 3013.

The obtaining unit 3011 is configured to obtain data about surrounding of the autonomous vehicle during the driving of the autonomous vehicle.

The recognizing unit 3012 is configured to recognize a person with onlooker intention within a predetermined range around the autonomous vehicle according to the obtained data.

The evacuating unit 3013 is configured to evacuate the person with onlooker intention in a predetermined manner.

Specifically, the obtaining unit 3011 may obtain data about surrounding of the vehicle acquired by a camera and/or radar mounted on the vehicle.

Correspondingly, the recognizing unit 3012 may analyze the obtained data, and if it is determined, through analysis, that a duration that a person is staying within the predetermined range around the vehicle is longer than a first predetermined period, identify the person as a person with onlooker intention.

For any person, based on the obtained data, if it is determined by a technique such as target tracking that the duration that the person is staying within a predetermined range around the vehicle is longer than the first predetermined period, then the person may be identified as a person with onlooker intention. A specific value of the first predetermined period may also be determined according to actual needs.

Staying within a predetermined range around the vehicle for a duration longer than the first predetermined period may mean staying at a certain location within a predetermined range around the vehicle without moving, for example staying in front of the vehicle without moving, or may mean keeping moving within a predetermined range around the vehicle, for example, walking around the vehicle, for a duration longer than the first predetermined period.

One or more persons recognized as having onlooker intention may be evacuated by the evacuating unit 3013 in a predetermined manner. For example, persons with onlooker intention may be evacuated by playing a voice, and/or persons with onlooker intention may be evacuated by displaying text on a screen on the vehicle. Certainly, other possible implementation modes may also be employed.

In addition, the apparatus shown in FIG. 3 may further include: a pre-processing module 300.

The pre-processing module 300 is configured to notify the evacuating module 301 to perform its own function when it is determined that a duration that the vehicle is driving at a speed lower than a predetermined threshold is longer than a second predetermined period.

In other words, if the vehicle is in a relatively normal driving state, e.g., the vehicle is driving at a speed higher than 30 km/h, or, although the vehicle is driving at a speed lower than 30 km/h, but the duration is very short, it is unnecessary to notify the evacuating module 301 to perform its own function. On the contrary, if the duration that the vehicle is driving at a speed lower than 30 km/h (including the case in which the speed is zero) is longer than the second predetermined period, the evacuating module 301 may be notified to perform its own function.

Reference may be made to relevant depictions in the above method embodiments for a specific workflow of the above apparatus embodiment shown in FIG. 3, which will not be detailed any more here.

In one word, the technical solution of the apparatus embodiment of the present disclosure may be employed to evacuate one or more persons, such as pedestrians, with onlooker intention in time, thereby ensuring the normal driving of the autonomous vehicle.

Figure 4:
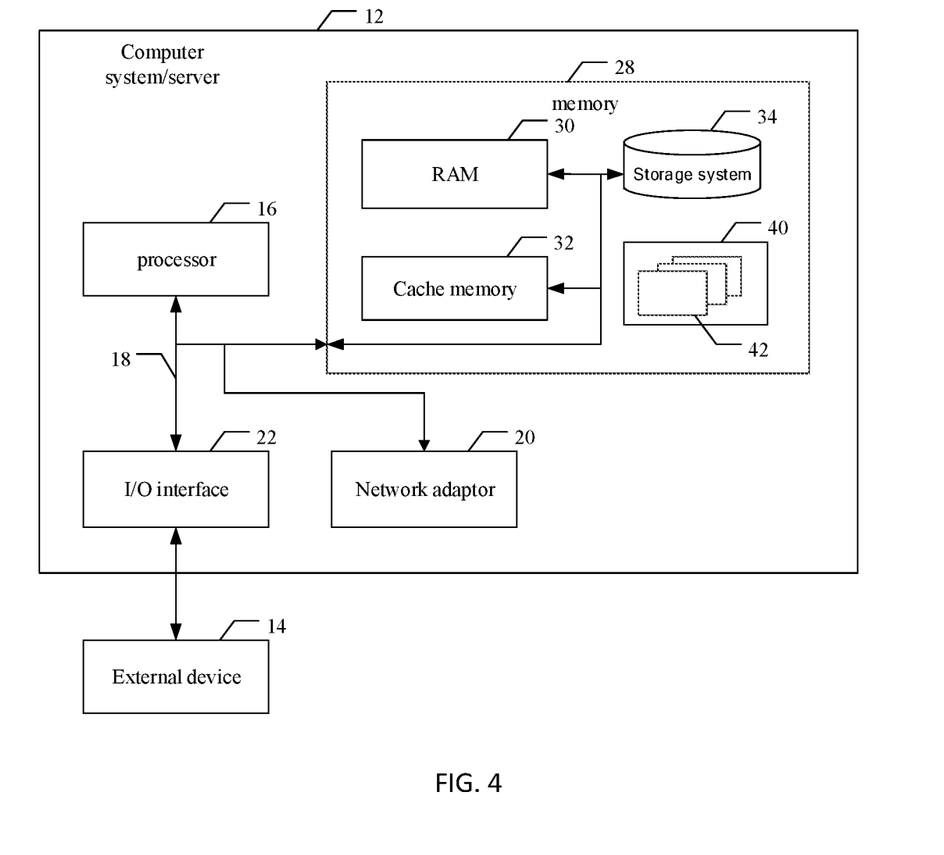
FIG. 4 illustrates a block diagram of an example computer system/server 12 adapted to implement an implementation mode of the present disclosure.

FIG. 4 illustrates a block diagram of an example computer system/server 12 adapted to implement an implementation mode of the present disclosure. The computer system/server 12 shown in FIG. 4 is only an example and should not bring about any limitation to the function and scope of use of the embodiments of the present disclosure.

As shown in FIG. 4, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 4, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implements the method in the embodiment shown in FIG. 1 or FIG. 2.

The present disclosure meanwhile provides a computer-readable storage medium on which a computer program is stored, the program, when executed by the processor, implementing the method stated in the embodiment shown in FIG. 1 or FIG. 2.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for evacuating a person around an autonomous vehicle, comprising:
    obtaining data about surrounding of the autonomous vehicle acquired by at least one of a camera or a radar mounted on the autonomous vehicle during the driving of the autonomous vehicle;
    recognizing a person with onlooker intention within a predetermined range around the autonomous vehicle after determining, through analyzing the data obtained, that a duration that the person is staying within the predetermined range around the autonomous vehicle is longer than a first predetermined period; and
    evacuating the person with onlooker intention in a predetermined manner,
    wherein before performing the above obtaining, recognizing and evacuating actions, judging whether a duration that the autonomous vehicle is driving at a speed lower than a predetermined threshold is longer than a second predetermined period,
    performing the above obtaining, recognizing and evacuating actions in response to determining that the duration that the autonomous vehicle is driving at the speed lower than the predetermined threshold is longer than the second predetermined period.

2. The method according to claim 1, wherein the camera comprises a binocular camera and a monocular camera, and the radar comprises an ultrasonic radar and a laser radar.

3. The method according to claim 1, wherein obtaining data about surrounding of the autonomous vehicle comprises:
    obtaining data about surrounding of the autonomous vehicle in real time.

4. The method according to claim 1, wherein evacuating the person with onlooker intention in a predetermined manner comprises:
    evacuating the person with onlooker intention by at least one of playing a voice, or displaying text on a screen of the autonomous vehicle.

5. A computer device, comprising:
    a memory;
    a processor; and
    a computer program which is stored on the memory and runs on the processor;

wherein the processor, upon executing the program, implements a method for evacuating a person around an autonomous vehicle, wherein the method comprises:

obtaining data about surrounding of the autonomous vehicle acquired by at least one of a camera or a radar mounted on the autonomous vehicle during the driving of the autonomous vehicle;

recognizing a person with onlooker intention within a predetermined range around the autonomous vehicle after determining, through analyzing the data obtained, that a duration that the person is staying within the predetermined range around the autonomous vehicle is longer than a first predetermined period; and evacuating the person with onlooker intention in a predetermined manner, wherein before performing the above obtaining, recognizing and evacuating actions, judging whether a duration that the autonomous vehicle is driving at a speed lower than a predetermined threshold is longer than a second predetermined period, performing the above obtaining, recognizing and evacuating actions in response to determining that the duration that the autonomous vehicle is driving at the speed lower than the predetermined threshold is longer than the second predetermined period.

6. The computer device according to claim 5, wherein the camera comprises a binocular camera and a monocular camera, and the radar comprises an ultrasonic radar and a laser radar.

7. The computer device according to claim 5, wherein obtaining data about surrounding of the autonomous vehicle comprises:

obtaining data about surrounding of the autonomous vehicle in real time.

8. The computer device according to claim 5, wherein evacuating the person with onlooker intention in a predetermined manner comprises:

evacuating the person with onlooker intention by at least one of playing a voice, or displaying text on a screen of the autonomous vehicle.

9. A non-transitory computer-readable storage medium on which a computer program is stored, wherein the program, when executed by a processor, implements a method for evacuating a person around an autonomous vehicle, wherein the method comprises:

obtaining data about surrounding of the autonomous vehicle acquired by at least one of a camera or a radar mounted on the autonomous vehicle during the driving of the autonomous vehicle;

recognizing a person with onlooker intention within a predetermined range around the autonomous vehicle after determining, through analyzing the data obtained, that a duration that the person is staying within the predetermined range around the autonomous vehicle is longer than a first predetermined period; and evacuating the person with onlooker intention in a predetermined manner, wherein before performing the above obtaining, recognizing and evacuating actions, judging whether a duration that the autonomous vehicle is driving at a speed lower than a predetermined threshold is longer than a second predetermined period, performing the above obtaining, recognizing and evacuating actions in response to determining that the duration that the autonomous vehicle is driving at the speed lower than the predetermined threshold is longer than the second predetermined period.

10. The non-transitory computer-readable storage medium according to claim 9, wherein the camera comprises a binocular camera and a monocular camera, and the radar comprises an ultrasonic radar and a laser radar.

11. The non-transitory computer-readable storage medium according to claim 9, wherein evacuating the person with onlooker intention in a predetermined manner comprises:

evacuating the person with onlooker intention by at least one of playing a voice, or displaying text on a screen of the autonomous vehicle.

* * * * *